UNITED STATES PATENT OFFICE.

WILLIAM NIEHOFF, OF VENEDY, ILLINOIS.

TREE-PULLER.

SPECIFICATION forming part of Letters Patent No. 359,884, dated March 22, 1887.

Application filed November 4, 1886. Serial No. 217,987. (No model.)

*To all whom it may concern:*

Be it known that I, WILLIAM NIEHOFF, a citizen of the United States, residing at Venedy, in the county of Washington and State of Illinois, have invented certain new and useful Improvements in Tree-Pullers; and I do declare the following to be a full, clear, and exact description of the invention, such as will enable others skilled in the art to which it appertains to make and use the same, reference being had to the accompanying drawings, and to letters or figures of reference marked thereon, which form a part of this specification.

Figure 1 of the drawings is a representation of a plan view of my invention. Fig. 2 is a vertical longitudinal section of the same. Fig. 3 is a detail sectional view.

My invention relates to tree-pullers; and it consists in the construction and novel combination of parts, as hereinafter described and claimed.

The object of my invention is to pull up trees by the roots, in order to clear off land ready for cultivation.

Referring by letter to the accompanying drawings, A designates the frame of the machine, which may be constructed either of wood or iron, but is preferably made of the latter material, in order that its dimensions may be small in comparison with the strength needed to properly perform the work, and also that the machine may be light enough to be conveniently moved from place to place.

B C are the girders of the frame, which are connected at their rear ends or made continuous in nearly the form of a horseshoe, and are securely bolted to the upper faces of the arms D E of the front and rear supports, F G. The feet of the supports F G are connected by or made integral with transverse sills or supporting-bars H I, which are made sufficiently wide to furnish good bearings for supporting the frame. These front and rear supports are also connected by longitudinal braces K L, which give additional strength to the structure. The front vertical support, F, is made longer than the rear support, so that the upper or girder portion of the frame will be inclined from its rear end upwardly to its front end.

M is a windlass, which is journaled in boxes N P, bolted upon the girders B C, near the front ends of the latter. The windlass M is provided near one end with a ratchet-wheel, Q, which is engaged by a detent, R, pivoted upon a bearing of the frame in front of the windlass, so that said detent will engage the ratchet-wheel, and will prevent backward rotation of the windlass when the machine is being operated to pull up a tree. The detent may be lifted out of engagement with the ratchet-wheel when it becomes necessary to unwind the rope S from the windlass. The shaft of the windlass is provided with a crank, 2, at each end, by which to operate it. At its rear end the frame of the machine is provided with ears T T, to which two chains, U U, are connected by hooks or otherwise. The other ends of the chains U U are connected by an S-shaped link to one end of a chain, V, which is provided at its other end with an angle-iron or dog, W, which is connected thereto by a ring.

X designates a pulley-block, which is provided with a pulley, Y, near one end, and with an eye, Z, at the other end. To this eye Z a chain, *a*, is connected by an S-hook, *b*, and at its outer end the chain *a* is provided with a dog, *c*. The rope S is wound upon the windlass, and its free end is passed over the pulley Y, and is provided with a link, *d*, which is secured to the rope S by tying the rope thereto.

*e* designates a hook, which is provided with a socket, *f*, in its shank *g*. The shank *g* of the hook *e* is provided with a pivoted link, *h*, to the outer end of which an S-hook, *i*, is hinged.

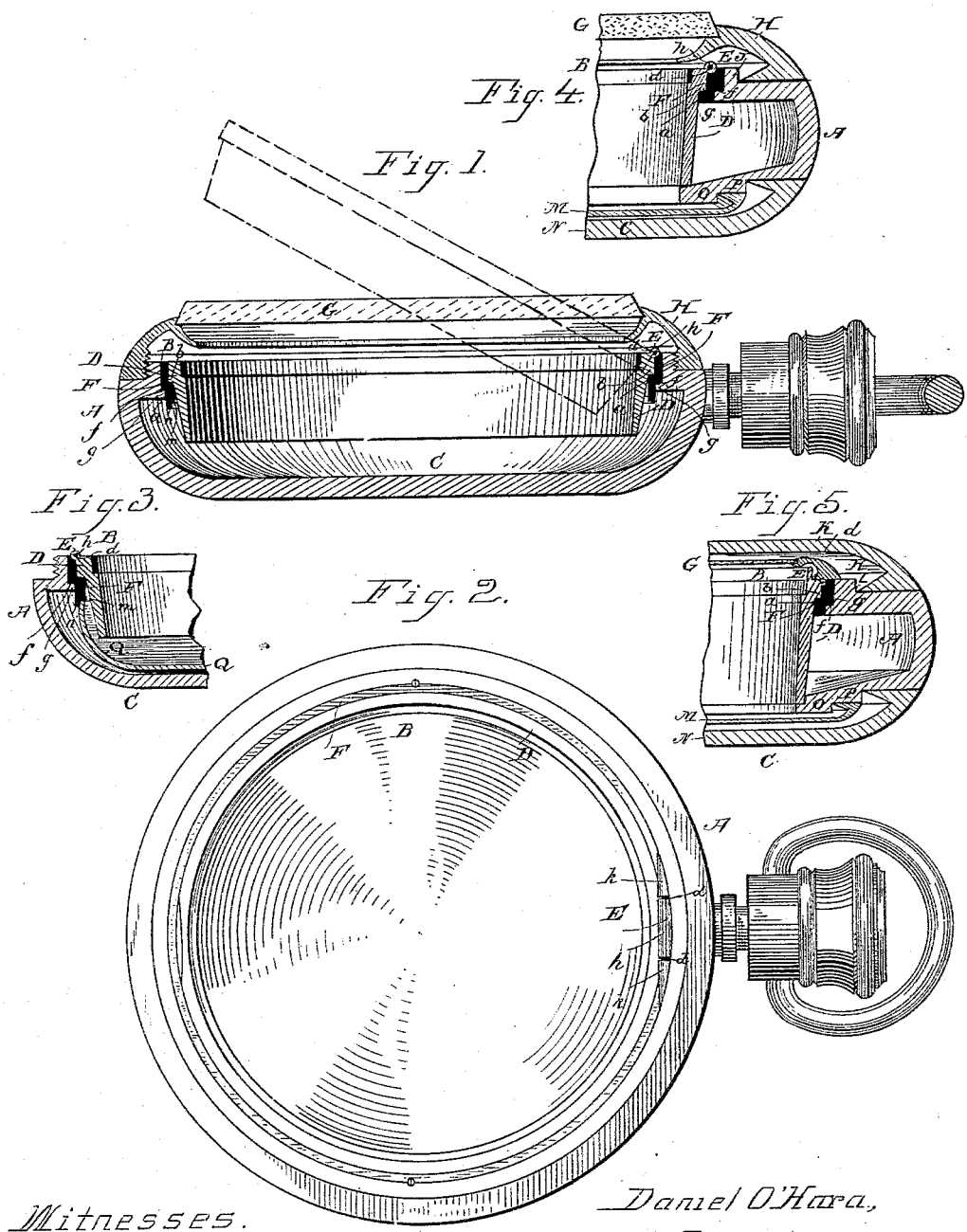

*k l m n* designate sections of a handle, which are designed to be used in connection with the hook *e* to place the hook in connection with a limb of the tree to be pulled. The frame, having been put in place, is connected by its chain and dog to a tree or other stationary object. Then the chain, which is provided with the pulley-block and pulley, is secured to another tree or suitable stationary object. The link *d* on the rope S is then placed in engagement with the hook *i* of the link *h*, and the shouldered point of the section K of the handle is inserted into the socket *f* of the hook *e*. The bases of each of the sections *k l* of the handle are enlarged and are provided with axially-bored seats *m'*. The lower ends of the bases